United States Patent
Uchida

[19]

[11] Patent Number: 6,047,756
[45] Date of Patent: Apr. 11, 2000

[54] SYSTEM FOR FORMING A BRAIDED HOLLOW CONTAINER WITH PLUGGED ENDS

[75] Inventor: Hiroshi Uchida, Oumihachiman, Japan

[73] Assignee: Murata Kikai Kabushiki Kaisha, Kyoto, Japan

[21] Appl. No.: 09/095,122

[22] Filed: Jun. 10, 1998

[30]    Foreign Application Priority Data

Aug. 20, 1997  [JP]  Japan .................................. 9-240383

[51] Int. Cl.⁷ .................................................. B65H 81/00
[52] U.S. Cl. .......................... 156/393; 156/149; 156/172; 156/430; 156/431; 156/432; 156/500; 264/542; 264/565
[58] Field of Search ..................... 156/149, 172, 156/173, 175, 425, 431, 430, 432, 393, 245, 500; 264/542, 543, 565

[56]            References Cited

U.S. PATENT DOCUMENTS

| | | | |
|---|---|---|---|
| 3,310,620 | 3/1967 | Martelli et al. | 264/542 X |
| 3,699,199 | 10/1972 | MacDuff | 264/542 X |
| 4,846,908 | 7/1989 | Aldrich et al. | 156/149 X |
| 5,150,812 | 9/1992 | Adams | 220/414 |

FOREIGN PATENT DOCUMENTS

| | | |
|---|---|---|
| 7-40449 | 2/1995 | Japan . |
| 8-105595 | 4/1996 | Japan . |

*Primary Examiner*—Jeff H. Aftergut
*Attorney, Agent, or Firm*—Armstrong, Westerman, Hattori, McLeland & Naughton

[57]            ABSTRACT

In order to reduce the weight and cost of LPG pressure-resistant containers, thermo-plastic resin is used in the continuous formation of a hollow container wherein the outer surface of a hollow continuous liner is continuously braided with multiple yarns. The present invention is a system for forming a braided hollow container comprised of a continuous liner forming section 1 which continuously forms the continuous liner 70 for the inner layer 72 of the hollow container in the axial direction through a hollow joining section 71, a braid forming section 2 which uses a braiding machine BR to braid the outside of the continuous liner to form the continuous braided body 73, cutting section 3 which cuts the continuous braided body in the radial direction in the hollow joint section, and a plug welding section 4 which welds a plug 75 to the openings formed by the cutting section; and the pressure-resistant container formed using said system.

6 Claims, 5 Drawing Sheets

SYSTEM FOR FORMING A BRAIDED HOLLOW CONTAINER WITH PLUGGED ENDS

FIELD OF THE INVENTION

The present invention relates to a system for forming hollow containers by means of braiding techniques wherein multiple yarns are continuously braided around the outside of a continuous hollow resin liner. This technology combines braiding techniques with plastic molding techniques to propose a light, cost-effective pressure-resistant container for storing Liquefied Petroleum Gas (LPG) and the like.

BACKGROUND OF THE INVENTION

Conventionally, LPG containers used for housing gasses like LPG in compressed form are made of metal in order to ensure resistance to pressure. However, since these metal pressure-resistant containers are very heavy, they require a great deal of effort to handle and transport, and they are also very costly.

A national project to make pressure-resistant containers from Fiberglass Reinforced Plastics (FRP) has been implemented in order to solve the difficulties posed by these metallic containers. The development of FPR pressure-resistant containers bas been very effective in creating light and cost effective containers which can be transported easily and mass produced at a low cost.

A project wherein the FRP pressure-resistant containers are manufactured using a braiding process and using a filament winding process where yarn is rotated and wound around the container is currently being undertaken.

The braiding process simultaneously assembles multiple yarns into braids, thereby increasing productivity, and improving mass-produceability. A braiding machine has the drawback of using small bobbins that are quickly depleted and thus difficult to process continuously, but by employing automatic bobbin replacement techniques, high productivity can be achieved for continuous processing. Further, when environmental issues are taken into consideration, although thermosetting resin is difficult to recycle, by using thermoplastic resin, containers that are easily recycled and environment-friendly can be produced.

The filament winding process uses thermosetting resin, creating great environmental concern because it cannot be recycled. Conversely, the FRP process uses hardly any thermoplastic resin.

Thus, it is an object of the present invention to propose a system for producing light, cost-effective, pressure-resistant containers for storing Liquefied Petroleum Gas (LPG) and the like by combining plastic molding and braiding techniques in order to continuously form the braided body by continuously combining multiple yarns around a continuous hollow plastic liner wherein the continuously braided hollow container is cut at a fixed location. This hollow container forming system is a braiding process that welds a plug in the area where an opening is cut.

A second object of the present invention is to propose the production of tough, light, recyclable, pressure-resistant containers.

SUMMARY OF THE INVENTION

The present invention, in order to accomplish the aforementioned objects, is a hollow container forming system comprised of a continuous liner forming section which forms the continuous liner for the inside layer of the continuous hollow container by passing it in the axial direction through a hollow joint section, a braid forming section which employs a braiding machine to braid around the outside of the continuous liner and form a continuous braided body, a cutting section which cuts the braided body in the radial direction at the hollow joint section, and a plug welding section which welds a plug to the opening section formed by the cutting of the braided body.

The continuous liner forming section of the present invention is a hollow container formation system comprising a resin transport means which melts the resin and transports it in tubular form, a plurality of opposing molds arranged in the transport direction to shape the tubular resin received from the resin transport means, an air blowing means to inflate the tubular resin in the molding section, and a mold transfer means to continuously move the molds from the exit of the resin transport means to the braid forming section.

The braid forming section of the braided hollow container formation system of the present invention is provided with an automatic bobbin replacement means which automatically exchanges bobbins.

The cutting section of the braided hollow container formation system of the present invention includes a synchronous operating means which operates at the same time as the mold transfer means.

The plug welding section of the braided hollow container formation system of the present invention is comprised of a first welding section which welds a first plug to one of the openings cut in the continuous braided body at the cutting section, and a second plug welding section which welds a second plug to the opening that has been cut in the braided hollow container.

Further, the present invention is a pressure-resistant container comprised of an inner-layer hollow container formed by means of thermoplastic resin molding, and an outer layer formed by braiding the outside of the inner layer hollow container.

BRIEF DESCRIPTION OF THE DRAWING

FIG. 3 shows a detailed example of the structure of the continuous liner molding section of the braided hollow container formation system.

FIG. 5 shows the structure of a detailed example of the metal plug welding means of the plug welding section of the braided hollow container formation system of the present invention. FIG. 5A is a side view cross section outline drawing showing the preparatory stage of the welding.

DETAILED DESCRIPTION OF THE PREFERRED EMBODIMENTS

An embodiment of the braided hollow container formation system and the pressure-resistant container of the present invention are now explained in detail in reference to the accompanying drawings.

Figure 1:
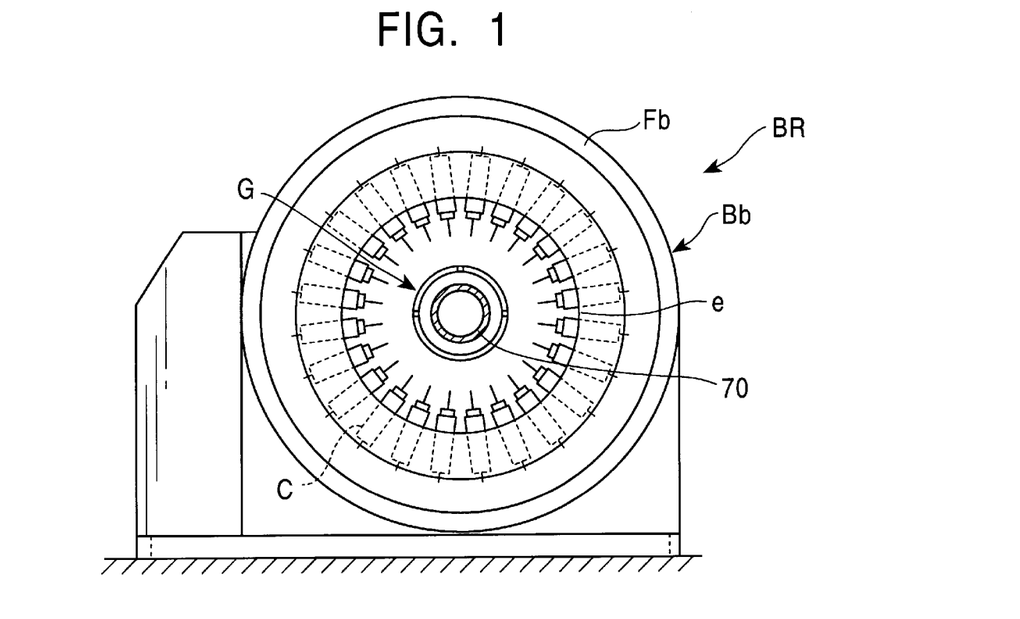
FIG. 1 is a front view outline drawing showing an example of the basic structure of a braiding machine used in the braided hollow container formation system of the present invention.
Figure 2:
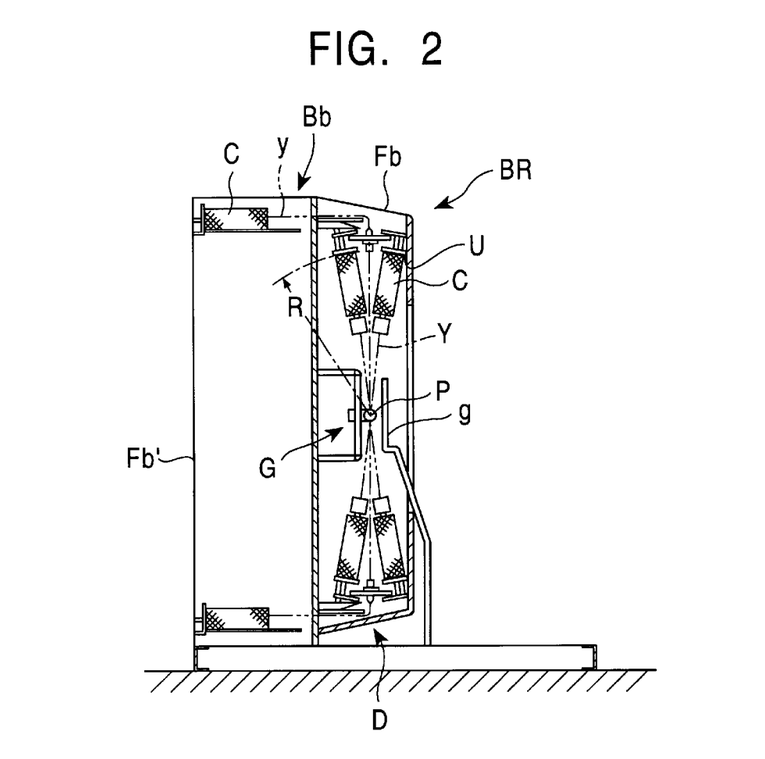
FIG. 2 is a side view cross section outline drawing of the braiding machine of FIG. 1.

First, the structure of the braiding machine will be explained based on FIG. 1. In FIG. 1 and FIG. 2, the braiding machine BR is comprised of a machine body Bb, and a continuous liner guide G which guides a moveable continuous liner formed and delivered from a continuous liner forming section.

The machine body Bb of the braiding machine BR is provided with a curved outer frame U which curves in a semi-circle around radius R and is arranged inside mostly tubular machine frame Fb which is provided with an opening e at one end in the lateral axial direction, a bobbin carrier C which runs along a carrier track curved around the inside of the outer frame U, a driving device D which drives the bobbin carrier C around in its track, and a yarn guide device g.

Yarns Y which are drawn out in the axial direction of the bobbins from the bobbin holders arranged in the bobbin carrier C are gathered at about the center of the outer frame U. Further, a liner 70 is positioned at just about the center of the outer frame U at the braiding position P where the yarns Y are braided around the outside of the liner 70.

Thus, as a result of the bobbin carrier C being driven along its track by the driving device D, a plurality of yarns Y are crossed, and as necessary, the central yarns y from the bobbin carrier C arranged generally horizontally in the frame Fb' of the machine frame Fb are crossed with yarns Y unwound from the bobbin carrier C which runs along its track, thus braiding is performed and a braid is formed around the outside of the liner 70.

The liner 70 is transported in the axial direction at a fixed speed as the braiding occurs. The speed of the movement of the liner 70 determines the angle of the braiding of the yarn Y around the liner 70, and by changing the speed of the movement of the liner 70 according to the liner's diameter, the predetermined braiding angle can be set.

Next, the continuous hollow container formation system for continuously shaping the hollow pressure-resistant container by means of the braiding machine BR will be explained.

The braided hollow container formation system of the present invention is essentially comprised of a continuous liner forming section 1 which continuously forms the continuous liner 70 for an inner layer 72A of a hollow container section 72 in the axial direction through a hollow joining section 71, a braid forming section 2 which forms a continuous braided body 73 including a braided layer 72B by braiding around the outside of the continuous liner 70 by means of the braiding machine BR, a cutting section 3 which cuts the continuous braided body 73 in the radial direction at a hollow joining portion 71, and a plug welding section 4 which welds a plug 75 to an opening 74 cut in the braided body 73. The plug welding section 4 of the present invention is comprised of a first plug welding section 4A which welds a first plug 75A to an opening 74 cut in the continuous braided body 73, and a second plug welding section 4B which welds a second plug 75B in an opening 77 cut in the braided hollow container 76 after the braided body 73 has been cut in the radial direction at the hollow joining section 71, and after the hollow braided container 76 has been formed.

Figure 3A:
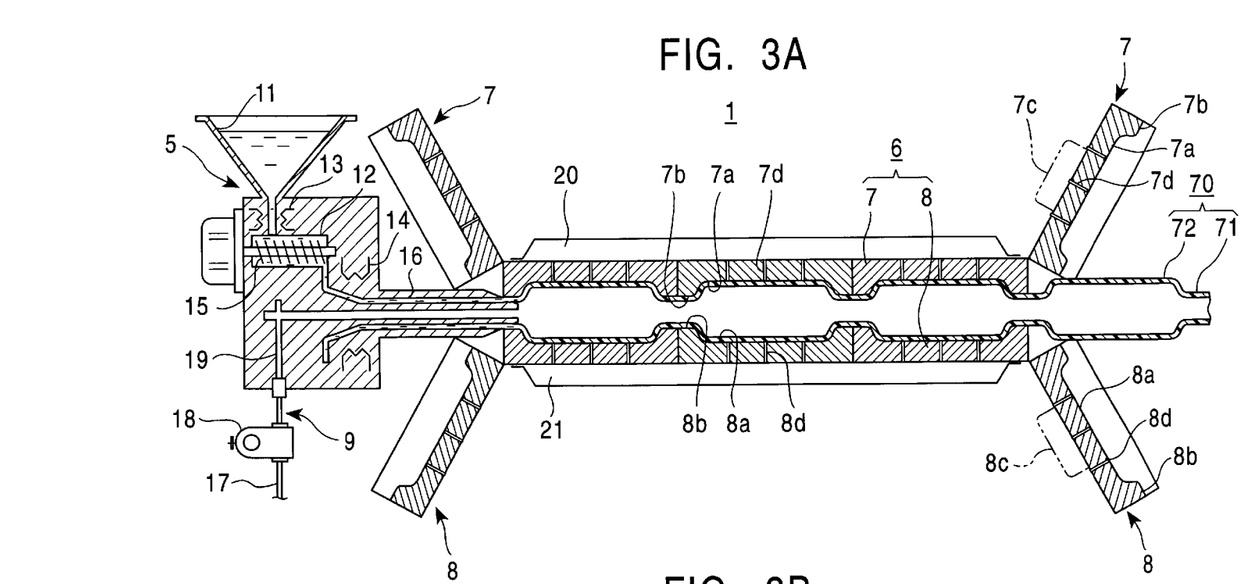
FIG. 3A is an outline side view cross section drawing of the continuous liner molding section.

The continuous liner forming section 1 is comprised of a resin transport means 5 which melts the resin and transports it in tubular form, a plurality of pairs of molds 6 comprised of an upper mold group 7 and a lower mold group 8 arranged in the transport direction in which the tubular resin is received from the resin transport means 5, an air injection means 9 which inflates the tubular resin inside the molds 6, and a mold transport means 10 which continuously transports the upper and lower molds 7, 8 from the exit of the resin transport means 5 to the braid forming section 2.

The resin transport means 5 is provided with a hopper 11, a cylinder 12, heaters 13, 14, a screw 15, and a transport path 16 for transporting the tubular mold. The air injection means 9 is provided with a compressed air supply 17, a regulator 18, and an air passage 19.

The plurality of pairs of the molds 6 are arranged such that the upper molds 7 and the lower molds 8 face each other, and on the surface of one side of each mold, mold surfaces 7a, 8a for the inner layer 72A of the hollow container section 72 in the continuous liner 70, and mold surfaces 7b, 8b for the hollow joining section 71, are provided. On the surface of the other side, joining sections 7c, 8c which face the mold transport means 10, are provided.

The upper and lower mold groups 7, 8 of each of the plurality of pairs of the molds 6 are provided with a plurality of through-holes 7d, 8d which run from the surface of one side of the mold surfaces 7a, 8a to the surface of the other. Suction means 20, 21 arranged at the back surface of the upper and lower mold groups 7, 8, enable the inside of the mold 6 to create a negative pressure state.

Figure 3B:
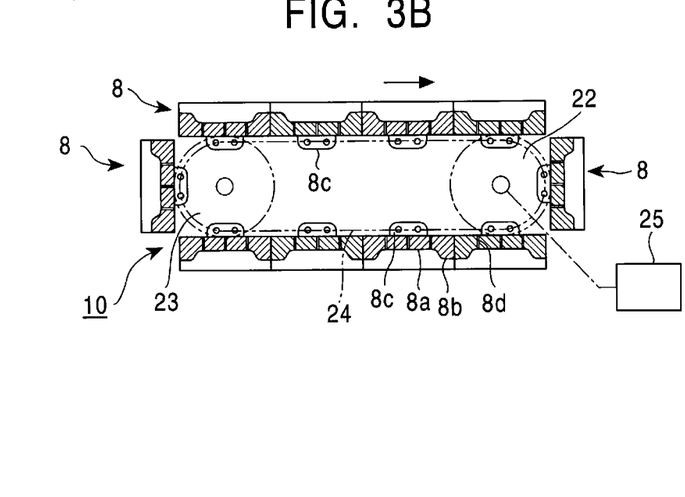
FIG. 3B is a side view cross section outline drawing showing an example of the mold transport means for continuously moving the mold formed in the continuous liner molding section.

An example of the mold transport means 10 is shown in FIG. 3B. FIG. 3B shows an example of the lower mold group 8 transport means, which has the same structure as the upper mold group 7 transport means. The mold transport means 10 of this example is a continuous loop system comprised of a driving gear 22, a drive-receiving gear 23 opposite the driving gear 22, and a chain 24 which is connected between the drive gear 22 and the drive-receiving gear 23. The lower mold group 8 is connected to the mold transport means 10 by the chain 24, and the driving of the lower mold group 8 is controlled through the control of a driving source 25 which is engaged with the driving gear 22.

In the continuous liner forming section 1 of the present invention, a thermoplastic resin substance like PP or PE, for example, is melted, and turned soft and doughy. It is then transported in tubular form, and expanded by the injection of air into the hollow of the tube. The outside of the tubular plastic joins perfectly into the molding surface of the molds with the aid of suction provided by the suction means, and thus the container is molded into shape. It is then cooled, and after it cools down completely, it is separated from the molds, and molds are transported to the resin transport means 5 in preparation for the next step.

Next, the braid forming section 2, the nucleus of the braided hollow container formation system of the present invention, will be explained.

The primary structures of the braid forming section 2 also comprise the basic structures of the braiding machine BR. As aforementioned, in the example of the present invention, a mandrel device Bm is composed of a continuous liner supporting means Sm which is supported so that it can move the continuous liner 70 formed and delivered from the continuous liner forming section 1, and thereby the braiding is performed around the outside of the continuous liner 70 by using the braiding machine, and a continuous liner braiding body 73 is formed.

Figure 4:
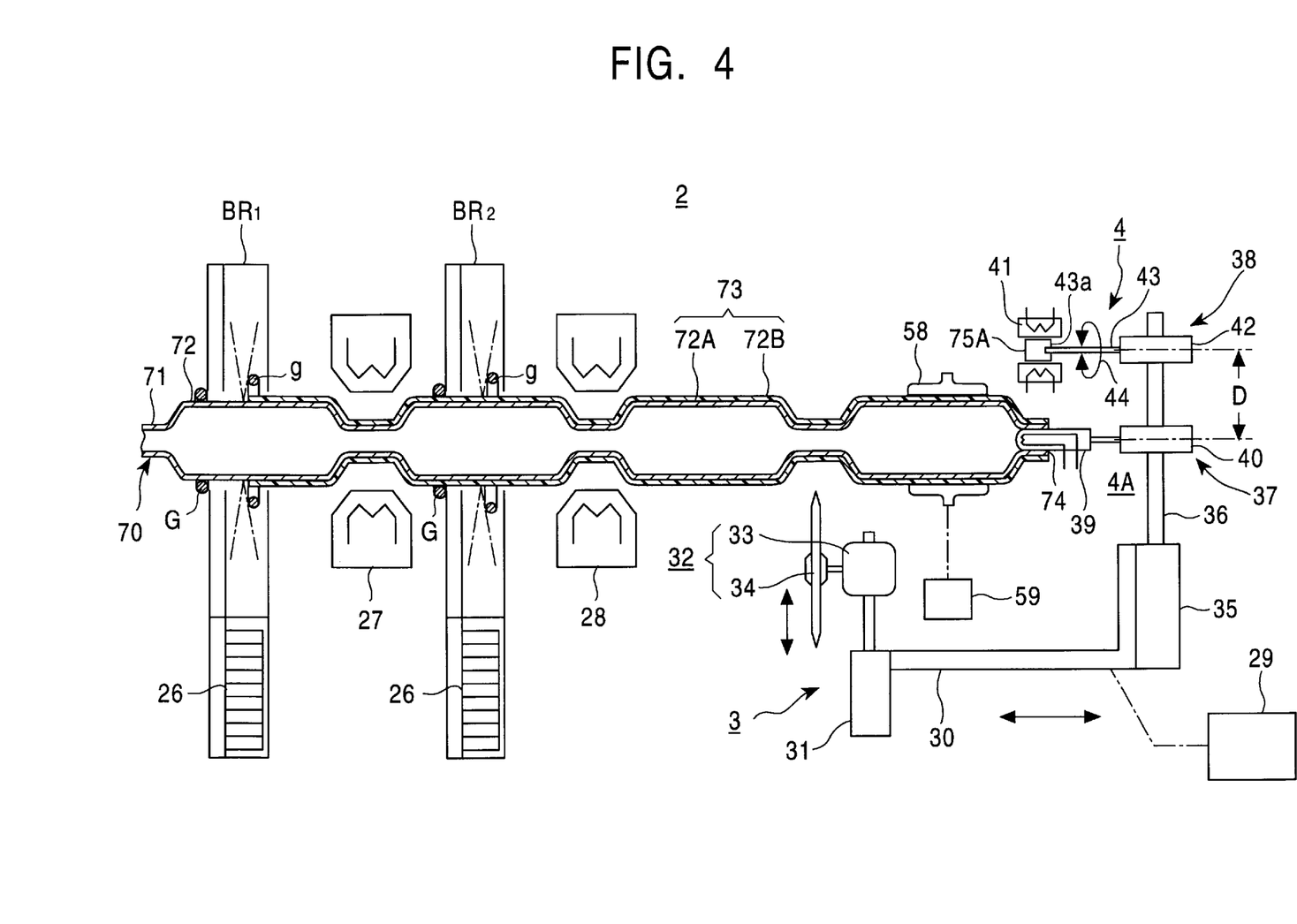
FIG. 4 is a side view cross section outline drawing showing a detailed example of the braid molding section, cutting section, and the closed plug welding means in the plug welding section of the braided hollow container formation system of the present invention.

The braid forming section 2 is provided with an automatic bobbin replacement means 26 which automatically replaces the bobbins, enabling the braiding process to be carried out continuously. The braid forming section 2 can be comprised of two braiding machines, first braider BR1 and second braider BR2, as shown in FIG. 4, so that multi-layer braiding can be carried out.

The braid forming section 2 is arranged just after the continuous liner forming section 1. The yarn used in the braiding machine BR is pre-pregged yarn, and this yarn may be glass fiber to which thermoplastic resin is added, glass fiber already compounded with thermoplastic resin, or glass fiber combined with yarn. In other words, the yarn adapted for use with the braiding machine BR of the present invention can be any thermoplastic-resin containing glass fiber, as desired. As the yarn is being braided, a resin layer is formed around the surface of the container by the melting of the resin by the shaping heaters 27, 28. To ensure the strength of the container and increase the number of braided layers, the number of braiding layers can be increased from the structure described above. After the resin has hardened, it is cut by the cutter in the cutting section in the next stage. It should be noted, however, that since the formation of the container occurs continuously, cutting should be timed to the delivery of the container.

The cutting section 3 which is arranged after the braid forming section 2 is comprised of a simultaneous operating means 29 which synchronously operates the mold transport means 10 in the braid forming section 2, a machine frame 30 which operates synchronously by means of the synchronous operating means 29, an elevating means 31 which is attached to the machine frame 30, and a cutting mechanism 32 which is raised and lowered by means of the elevating means 31. The elevating means 31 can be comprised of, for example, an elevating hydraulic cylinder attached to the machine frame 30 and the cutting mechanism 32 can be comprised of a rotating cutter 34 which rotates by means of a rotation driving source 33.

At the cutting section 3, the continuous braided body 73 braided at the braid forming section 2 is cut in the radial direction in the hollow joining section 71, forming opening portion 74 at the tip of the continuous braided body 73. The continuous braided body 73 is then cut again in the hollow joining section 71 at the next stage, forming opening 77. The braided hollow container 76 provided with the two openings is thus cut and separated.

Next, the structure of the plug welding section 4 of the braided hollow container formation system of the present invention will be explained.

The plug welding section 4 is comprised of a first plug welding section 4A which welds a first plug 75A at the opening section 74 of the continuous braided body 73, and a second plug welding section 4B which yields a second plug 75B at the opening section 77 of the braided hollow container 76 after the braided hollow container 76 has been formed by cutting the continuous braided body 73 in the radial direction at the hollow joining section 71.

The first plug welding section 4A is comprised of an elevating means 35 attached to the machine frame 30 (this machine frame 30 operates synchronously by means of the synchronous operating means 29 which synchronously operates with the mold transport means 10 of the braid forming section 2), an inner heating mechanism 37 and a plug heater 38 that are attached to an output shaft 36 of the elevating means 35 at distance D apart such that it can be raised and lowered by the elevating means 35.

The elevating means 35 may be, for example, a hydraulic cylinder for performing raising and lowering operations, is attached to the machine frame 30, and operate at the distance D of its range of motion between the inner heating means 37 and the plug heating means 38.

The inner heater mechanism 37 in the first plug welding section 4A is comprised of an inner heater 39 for heating and melting the inner surface of the opening 74 cut in the continuous braided body 73, and a front/rear moving member 40 for moving the inner heater 39. In the welding preparation stage, the inner surface of the opening 74 is heated while in the front position of the front/rear moving member 40.

The plug heater mechanism 38 in the first plug welding section 4A is comprised of a plug heater 41 and a front/rear moving means 42 for holding and moving the first plug 75A. In the welding preparation stage, the first plug 75A is positioned inside the plug heater 41 in the front position of the front/rear moving means 42, and the outer surface of the first plug 75A is heated. The first plug 75A may, for example, be provided with a hexagonal groove at the tip which engages with the tip of a hexagonal shaft 43a provided in the output shaft 43 of the front/rear moving means 42.

The plug heater mechanism 38 is provided with a rotation means 44 for rotating the first plug 75A which is supported by the output shaft 43 of the front/rear moving means 42.

The second plug welding section 4B welds the second plug 75B to the opening 77 of the braided hollow container 76 cut in the cutting section 2. Its structure is the same as the first plug welding section 4A.

The second plug welding section 4B is comprised of an elevating means 45, an inner heating mechanism 47 and a plug heating mechanism 48 which are attached in the axial direction of an output shaft 46 of the elevating means 45 at a distance D apart such that they may be raised and lowered by the elevating means 45.

The elevating means 45 may be, for example, a hydraulic cylinder for performing raising and lowering operations, and the elevating means 45 operate at the distance of their range of motion between the inner heating means 47 and the plug heating means 48 in the axial direction.

The inner heater mechanism 47 in the second plug welding section 4B is comprised of an inner heater 49 for heating and melting the inner surface of the opening 77 cut in the braided hollow container 76, and a front/rear moving member 50 for moving the inner heater 49. In the welding preparation stage, the inner surface of the opening 77 is heated while in the front position of the front/rear moving member 50.

Figures 5A, 5C:
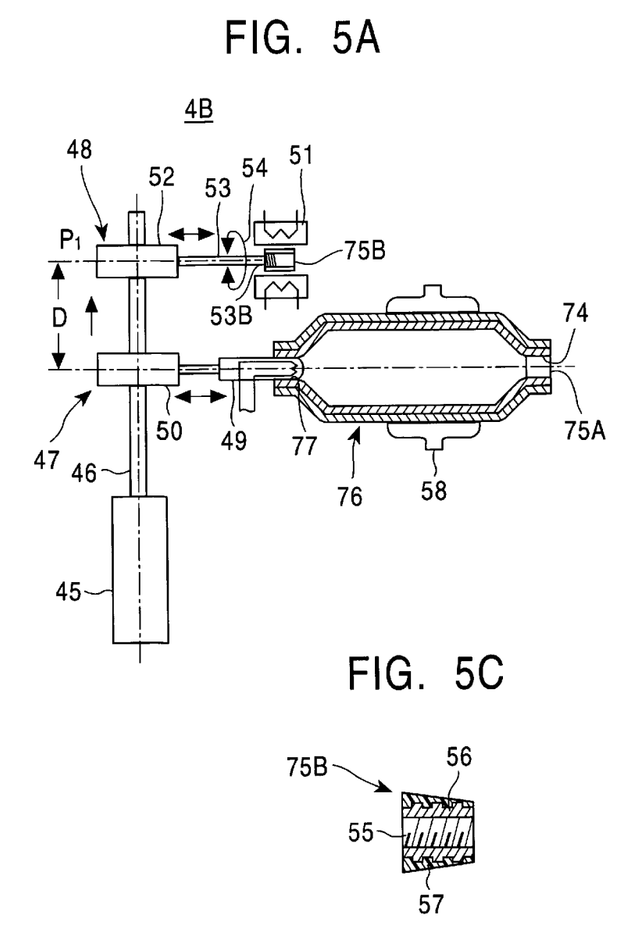

The plug heater mechanism 48 in the second plug welding section 4B is comprised of a plug heater 51, and a front/rear moving means 52 for holding and moving the second plug 75B. In the welding preparation stage, the second plug 75B is positioned inside a plug heater 51 in the front position of the front/rear moving means 52, and the outer surface of the second plug 75B is heated. The second plug 75B may, for example, be provided with a metal plug for filling and removing the contents of the container, a metal member 56 provided with a screw hole opening 55, and a resin layer 57 formed around the surface of the metal member 56. The screw opening 53a in the output shaft 53 of the front/rear moving means 52 is attached with a screw to the screw hole opening 55, and is supported in the output shaft 53 of the front/rear moving means 52.

The plug heater mechanism 48 is provided with a rotation means 54 for rotating the second plug 75B which is supported by the output shaft 53 of the front/rear moving means 52.

In the embodiment shown in FIG. 5, FIG. 5A shows the preparatory state for plug welding. The elevating means 45 is operated, and upper welding position P1 is set. At that position, the inner heating mechanism 47 and the plug heating mechanism 48 are extended. The inner heater 49 of the inner heating mechanism 47 is inserted into the cut opening section 77 of the braided hollow container 76, applying heat to and melting the inner surface of the opening section 77. Simultaneously, the second plug 75B is inserted into the plug heater 51 by means of the plug heating mechanism 48, and the outer surface of the plug 75B is heated and melted. After the plug 75B and opening have been appropriately heated, the inner heating mechanism 47 and the plug heating mechanism 48 are withdrawn to their original positions.

Figure 5B:
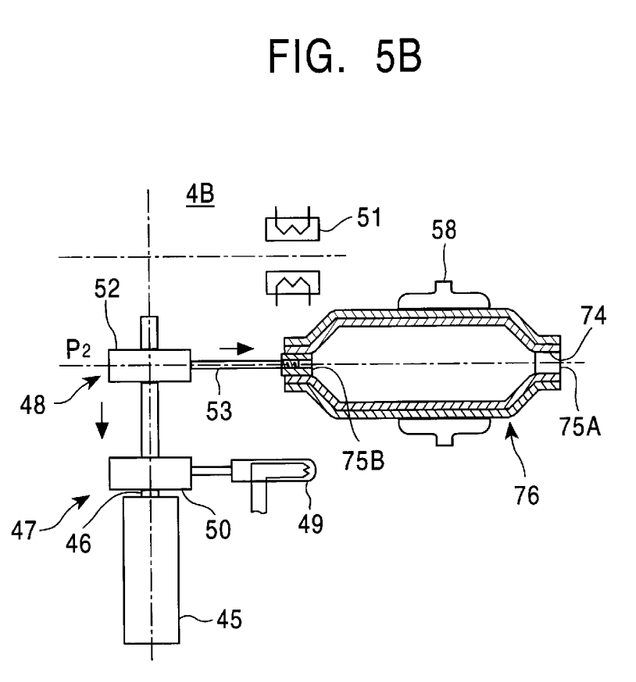
FIG. 5B is a side view cross section outline drawing during the welding stage, and FIG. 5C a side view cross section drawing of an example of the metal plug.

FIG. 5B illustrates the plug welding stage. The elevating means 45 is operated, and lower welding position P2 is set. At that position, the inner heating mechanism 47 and the plug heating mechanism 48 are extended, and the second plug 75B is inserted into the cut opening section 77 of the hollow braided container 76 by means of the plug heating mechanism 48. At this point, the inner surface of the cut opening section 77 of the hollow braided container 76 and the outer surface of second plug 75B are melted from processing at the preparatory stage, so the inner surface of the cut opening section 77 of the hollow braided container 76 and the outer surface of the second plug 75B bond firmly to each other.

As shown in each of the figures of FIG. 4 and FIG. 5, the hollow braided container 76 cut out from the braided body 73 is held by a chuck 58. The chuck 58 is provided with an appropriate transfer means 59 which is capable of transporting the hollow braided container 76 from the first plug welding section 4A to the second plug welding section 4B.

Figure 6:
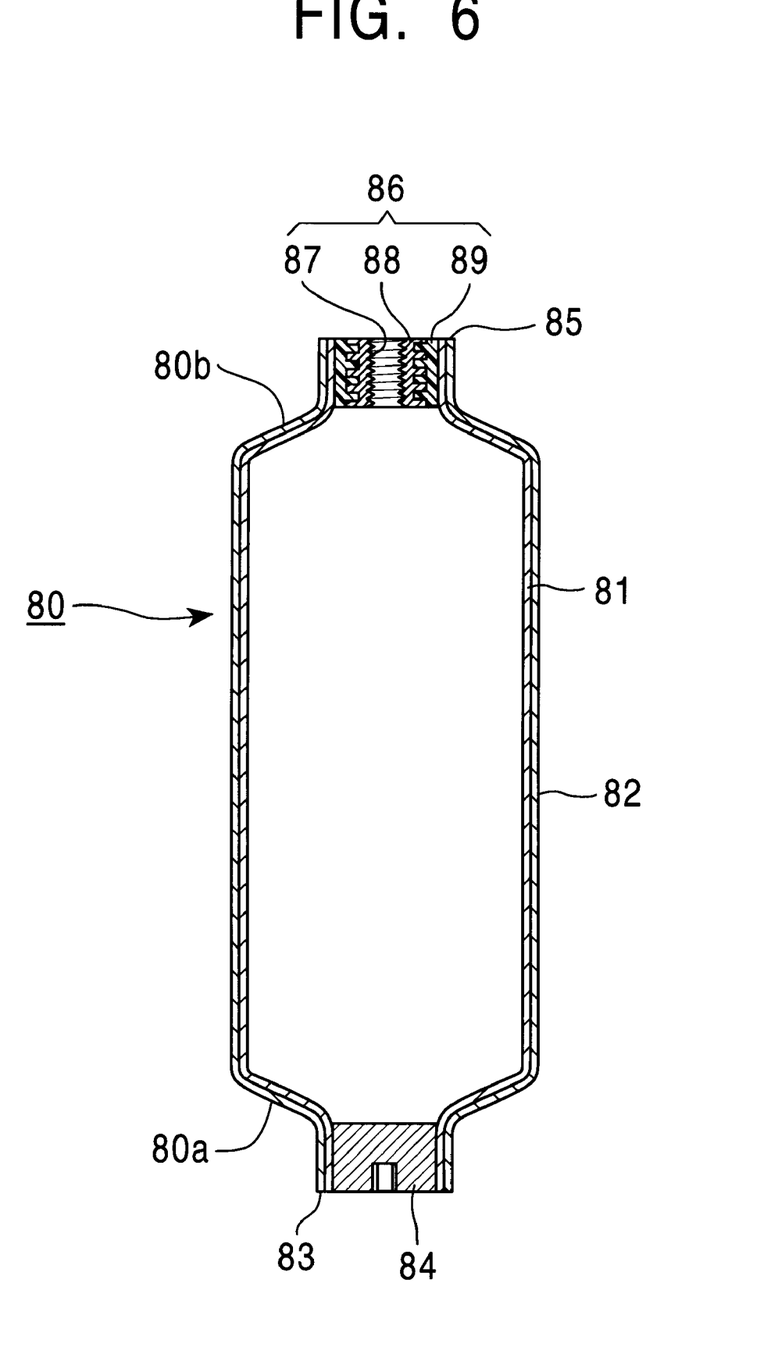
FIG. 6 is a side view cross section outline drawing showing a detailed embodiment of a pressure-resistant container of the present invention.

Next, the construction of the pressure-resistant container 80 produced by means of the braided hollow container forming system described above will be explained.

The pressure-resistant container 80 of the present invention is comprised of a hollow container inner layer 81 formed by the molding of the thermo-plastic resin, and a braided outer layer 82 formed by braiding the outer surface of the hollow container inner layer 81. This pressure-resistant container 80 is formed by braiding the hollow container inner layer formed of thermo-plastic resin with thermo-plastic resin-blended yarn which is then heat processed by the shaping heaters 27, 28 in the final stage of braiding, thereby melting the two layers into a single body, creating an extremely powerful container wall.

A bottom end 83 of one of the axial sides 80a of the pressure-resistant container 80 is firmly sealed with a sealant plug 84. A metal capsule plug 86 is attached to the end 85 of the other axial side 80b of pressure-resistant container 80. This metal plug 86 is formed as a screw 87 engaged with metal member 88 inserted between resin 89 that has been cut off.

Structured as described above, the braided hollow container forming system of the present inventions is extremely effective in that it enables production of braided pressure-resistant containers which are lighter than conventional metal pressure-resistant containers, and thereby resolve the biggest problem of these conventional metal containers.

Further, the braided hollow container forming system of the present invention enables continuous processing of continuous liner formation, braiding, cutting, and plug welding, thereby increasing the mass-produceability and the cost-effectiveness of the hollow containers, achieving great economic advantages over conventional systems.

Still further, the braided hollow container forming system of the present invention enables the hollow container to be made out of thermo-plastic resin materials, thus making the container degradable, easily recyclable, and thus environmentally friendly.

What is claimed is:

1. A continuous system for forming thermoplastic, braided, hollow, shaped containers with plugged ends, comprising in combination:

a continuous liner forming section which continuously forms, in an axial direction, a hollow liner having both shaped sections for forming inner layers of the shaped containers and hollow joining sections between the shaped sections;

a braid forming section, downstream from the continuous liner forming section, comprising at least one braiding machine for forming at least one braided layer around the outside of the hollow liner creating a braided continuous body;

a cutting section, downstream from the braid forming section, for cutting the braided continuous body at the hollow joining sections thus creating separate shaped containers having an opening at either end of the shaped container where the hollow joining section was connected; and a plug welding section, downstream from the cutting section for welding a plug into each opening of the shaped containers.

2. The continuous system for forming thermoplastic, braided, hollow, shaped containers with plugged ends of claim 1, wherein the plug welding section welds metal plugs into each opening of the shaped containers.

3. The continuous system for forming thermoplastic, braided, hollow, shaped containers with plugged ends according to claim 1 wherein said continuous liner forming section is comprised of;

a resin transporting means which transports melted resin in tubular form, a plurality of pairs of molds arranged in a transporting direction which receive the tubular resin sent from the resin transporting means, an air blowing means which expands the tubular resin in the molds, and a mold transporting means which continuously transports the molds from an exit of the resin transporting means towards the braid forming section.

4. The continuous system for forming thermoplastic, braided, hollow, shaped containers with plugged ends according to claim 1 wherein said braid forming section is provided with an automatic bobbin exchange means which automatically replaces bobbins in the at least one braiding machine.

5. The continuous system for forming thermoplastic, braided, hollow, shaped containers with plugged ends according to claim 1 wherein said cutting section is comprised of a synchronous operating means which operates said cutting section synchronously with the mold transporting means.

6. The continuous system for forming thermoplastic, braided, hollow, shaped containers with plugged ends according to claim 1 wherein the plug welding section is comprised of a first plug welding section which welds a first plug to a first opening cut in the continuous braided body by the cutting section, and a second plug welding section which welds a second plug to a second opending cut in the braided hollow container.

* * * * *